United States Patent [19]

Saunders

[11] 4,175,158
[45] Nov. 20, 1979

[54] AGGLOMERATING PARTICULATE PERLITE

[76] Inventor: Elerington Saunders, 2835 E. Van Buren St., Phoenix, Ariz. 85009

[21] Appl. No.: 842,888

[22] Filed: Oct. 17, 1977

[51] Int. Cl.² ................ B32B 9/00; C04B 31/22
[52] U.S. Cl. .................... 428/402; 106/DIG. 2; 252/378 P; 252/455 R; 210/502; 210/506; 428/403; 428/404; 428/406; 428/427; 428/446; 264/117
[58] Field of Search ........... 428/402, 406, 404, 403, 428/427, 446; 264/117; 106/DIG. 2; 210/502, 506; 252/455 R, 378 P, 432

[56] References Cited

U.S. PATENT DOCUMENTS

| | | | |
|---|---|---|---|
| 1,677,701 | 7/1928 | Alton | 428/404 |
| 2,904,424 | 9/1959 | Chapman | 252/378 P |
| 2,970,060 | 1/1961 | Burnett | 106/DIG. 2 |
| 2,970,061 | 1/1961 | Burnett | 106/DIG. 2 |
| 3,233,740 | 2/1966 | Vander Linden | 210/502 |
| 3,235,635 | 2/1966 | Riede | 264/117 |
| 3,441,515 | 4/1969 | Oshida | 210/502 |
| 3,515,624 | 6/1970 | Garvero | 428/402 |
| 3,653,862 | 4/1972 | Lynch | 428/427 |
| 3,810,773 | 5/1974 | Shannon | 106/DIG. 2 |
| 4,064,071 | 12/1977 | Gilmour | 264/117 |

Primary Examiner—Ellis P. Robinson
Attorney, Agent, or Firm—Brian G. Brunsvold; Stephen L. Peterson; Everett H. Murray, Jr.

[57] ABSTRACT

Particulate perlite fines are agglomerated to increase the apparent particle size by forming a mixture of the perlite fines with a compound such as boric acid capable of being substantially converted to $B_2O_3$ at elevated temperatures. The mixture is heated while mixing to convert the compound to $B_2O_3$ and to at least partially coat the particulate perlite. The mixture is then heated above the melting point of $B_2O_3$ to agglomerate the perlite fines. The product of this process has particular utility as an improved filter aid.

14 Claims, No Drawings

AGGLOMERATING PARTICULATE PERLITE

BACKGROUND OF THE INVENTION

The present invention relates to a method of producing perlite filter aids from particulate perlite fines and the resulting product.

Particulate perlite fines are the by-products of the production of cellular perlite particles. The mineral perlite is an igneous rock, generally tan or gray, that is generally comprised of from 65 to 70 weight percent silica, 12 to 16 weight percent alumina, zero to 6 weight percent water with small amounts of the oxides of sodium, potassium, calcium and magnesium.

The presence of the water provides the mineral with a unique property when it is exposed to high temperatures. In the range of from 1400° to 2000° F., the bulk material is softened and the volatilization and release of the vaporized water causes a sudden expansion of the mineral to several times its original size. The expanded product may have a density in the range of from 2 to 10 lbs./cu ft.

The expansion heat treatment is not always uniform and the nature of the final product depends on the water content and particle size of the mineral, the temperature of the heat treatment and the rate of heating. If the pre-expanded mineral is heated too slowly, the combined water is removed from the mineral through pores in the mineral leaving a slightly porous but relatively dense product. If the rate of heating is excessive, then the expansion of the water may be so violent as to shatter the perlite particle forming numerous fines.

There are many uses for the fines produced by the perlite expansion process, one of which is termed a filter aid. A filter aid is a particulate material, inert to the liquid to be filtered, used to remove finely divided colloidal suspensoids from liquids. The material comprising the filter aid is deposited as a layer on a conventional filter medium and a good filter aid will retain a large proportion of the suspended material in the filtrate while allowing a substantial flow rate of filtrate through the filter.

One problem associated with the use of perlite fines as filter aids is the fact that extremely small perlite particles reduce the flow rate of filtrate to a degree that the filtration process utilizing such materials is uneconomically slow. An improvement in the flow characteristics of perlite fines is accomplished by agglomerating the particles to form larger particles having more favorable filtration characteristics.

Typical of the prior art attempts to agglomerate perlite fines to form an improved filter aid is the disclosure of U.S. Pat. No. 3,235,635 which teaches an agglomeration technique comprising the spraying of an atomized liquid on suspended perlite fines. The liquid coalesces the fine particles of perlite and the resulting agglomerates are subjected to a calcining step. The primary disadvantage of this method is that the product has a low attrition resistance unless the time/temperature combination of the calcining process is substantial enough to promote significant amounts of diffusion bonding the particles in the agglomerate. The energy requirements for such a strengthening of the product are high and normally some type of flux or binder is used to bond the particles into an agglomerate. This prior art reference also teaches the use of soda ash admixed in water solution with the perlite fines to improve the sintering characteristics of the particles in the agglomerate. Both the addition of a coalescing liquid and additions of solid flux in a liquid medium have a severe shortcoming in that large amounts of energy are required to remove the liquids from the initial mixture to form the final product.

The present invention provides an agglomerated perlite product well adapted for use as a filter aid without the large energy requirements associated with the removal of liquids during heating operations. In addition, a filter aid produced by the present invention has excellent filtering properties with relatively high permeability flow rate ratios and low cake densities. The agglomerated product also exhibits excellent strength as measured by its resistance to attrition.

SUMMARY OF THE INVENTION

As broadly described herein, the invention comprises particulate perlite agglomerated with $B_2O_3$ to form an improved filter aid. The product is formed by agglomerating particulate perlite by commingling the particulate perlite with a boron compound to form a particulate mixture. The boron compound in the mixture is one capable of being substantially converted to $B_2O_3$ at elevated temperatures. The mixture is heated to the elevated temperature while continuously mixing the materials for a time sufficient to convert the boron compound to $B_2O_3$. Subsequently, the mixture is heated above the melting point of $B_2O_3$ to coalesce the particulate perlite into an agglomerate.

Preferably, the boron compound is a solid particulate of boric acid, $H_3BO_3$.

It is also preferred that the heating of the mixture be for a time sufficient to diffuse the $B_2O_3$ into the perlite particles to lower the water solubility of the agglomerates.

DETAILED DESCRIPTION OF THE INVENTION

The present invention, as embodied in the process of making an improved agglomerate of expanded perlite fines and the product itself, is shown by example in the upgrading of expanded perlite fines which are obtained as a by-product in the production of filter aids. These materials are merely examples of perlite fines capable of being upgraded by the process and the characteristics of the input materials are not known to be critical. The product designated as A is comprised of perlite particles having a mean particle size in the range of from 1 to 40 microns, usually averaging from 6 to 10 microns. The product designated as B is comprised of particles having a mean particle size in the range of from 3 to 100 microns, usually averaging from 18 to 30 microns. The particle sizes reported above were determined by Coulter Counter analysis. The A and B products were not capable of adequate filter aid performance in their unagglomerated state. Table I illustrates the typical properties of these two examples of appropriate input materials as compared with some commercial filter aids.

Table I

| Material | Average Particle Size | PFR | PCD |
|---|---|---|---|
| A | 6–10 microns | 26 | 20.5 |
| B | 18–30 microns | 55 | 15.6 |
| Commerical Product #1 | 20–50 microns | 124 | 14.5 |
| Commerical | | | |

Table I-continued

| Material | Average Particle Size | PFR | PCD |
|---|---|---|---|
| Product #2 | 35–55 microns | 116 | 14.7 |

[1]PFR = Permeability flow rate ratio (%).
[2]PCD = Wet cake density (lbs./cu ft.).

Commercial products #1 and #2 are high flow rate perlite filter aids produced and sold by the Dicalite Division of Grefco Inc.

As Table I illustrates, the input materials A and B exhibit markedly inferior filtering characteristics as measured by the permeability flow rate ratio (PFR) and the wet cake density (PCD). The PFR values are determined by measuring the time required for a given quantity of water to filter through a given weight of filter aid product. The standard product is assigned a flow rate value of 100. In this procedure, a given weight of the filter aid is placed in a beaker and a sufficient amount of distilled water is added. The filter aid is dispersed in the water and poured into a "permeability tube." This is a graduated tube having a piece of wet duck filter cloth stretched across one end which is placed on a bored stopper inserted in a filter flask so that the permeability tube is aligned vertically. While maintaining a constant vacuum on the filter flask by means of a vacuum regulator, the slurry of filter aid is poured gradually into the permeability tube. When the filter cake is nearly completely formed, an additional amount of distilled water is added to fill the tube. The time for the flow of a given volume is recorded. The cake volume is read to the nearest one-tenth ml. and a record is made of the vacuum, temperature, time and cake volume. The PFR (percent) is calculated as follows:

$$PFR\ (\%) = 100 \sqrt{\frac{K_1\ \text{Sample}}{K_2\ \text{Standard}}}$$

$K_1 = V/O$, where:

V = cake volume in ml.
O = time of flow for a given volume in seconds at constant vacuum and temperature.

$K_2$ = permeability constant

Since PFR is a filtration flow ratio, it is a function of the square root of the permeability ratio.

It has been found that the PFR data accurately predict the performance of the filter aid in a variety of industrial liquids to be filtered by the product.

The wet cake density (PCD) is the density of the actual filter aid as deposited in layer form on the septum of a filter.

From these parameters it can be seen that an effective filter aid should have a high PFR value and a low PCD. The present invention results in a filter aid product having such characteristics utilizing as starting materials, perlite fines for which there might otherwise be limited use. The starting materials need not be of the particular particle size of the materials disclosed above but need only be of such a small size that the performance of that product as a filter aid would be improved by agglomerating the particles. Such products are termed perlite fines in the present disclosure and this term would normally apply to particulate perlite having a mean particle size in the range of from 1 to 30 microns. The invention has shown utility in agglomerating perlite fines of a size smaller than would be retained on a −50 U.S. Standard mesh screen having an average particle size of approximately 5 microns.

The perlite fines are agglomerated by commingling the particulate perlite fines with a compound capable of being substantially converted to $B_2O_3$ at elevated temperatures. An example of such a material and a preferred embodiment of the invention is boric acid, $H_3BO_3$. The use of particulate solid $H_3BO_3$ is preferred since it is solid at room temperature and there is no need for a liquid vehicle that would increase the energy needed to carry out the heating steps. Particular success with the invention has experienced with the particulate $H_3BO_3$ having a particle size such that it passes through a −325 U.S. Standard mesh screen. The use of the solid particulate $H_3BO_3$ is preferred since the boron compound can be readily mixed with the perlite fines to form a uniform particulate mixture. Since $H_3BO_3$ melts at a temperature of approximately 365° F., the addition of the liquid $H_3BO_3$ would also be possible.

The particulate mixture of perlite fines and the boron compound are heated while mixing the materials to a temperature sufficient to convert the boron compound to $B_2O_3$. When particulate $H_3BO_3$ is the source of $B_2O_3$, preferably the mixture is first heated to a temperature in excess of the melting point of $H_3BO_3$ while the particulate mixture is continuously mixed. A preferred temperature for this treatment is 400° F. and at those temperatures the liquid $H_3BO_3$ is dispersed in the perlite fines and at least partially coats the individual particles. This initial treatment has a beneficial effect on the filter characteristics of the final product as illustrated in Table II.

Table II

| Material | Initial Treatment | Elevated Temperature Treatment | PFR | PCD | $H_2O$ Sol (%) | 1 hr. attrition PFR | 1 hr. attrition PCD |
|---|---|---|---|---|---|---|---|
| A | (starting material) | | 26 | 20.5 | 0.12 | 23 | 21.5 |
| Sample C | Room Temp. mixing | Expander 1600° F. | 83 | 13.9 | 1.16 | — | — |
| Sample D | 5 Mins. 400° F. mixing | Expander 1600° F. | 157 | 10.2 | 1.30 | 78 | 19.2 |
| Sample E | Room Temp. mixing | Muffle 2 hrs 1400° F. | 70 | 14.5 | 0.14 | — | — |
| Sample F | 5 Mins. 400° F. | Muffle 2 hrs 1400° F. | 182 | 7.8 | 0.10 | 98 | 12.2 |

Table II illustrates the benefits of the relatively low temperature heating step (initial treatment) carried out on the mixture before the $B_2O_3$ is formed to agglomerate the particles. In addition to the flow and density characteristics of the material, the percent water solubility as measured by a weight loss of the agglomerate is also displayed in Table II. Furthermore, Table II illustrates the attrition resistance of the product treated by the low temperature pre-agglomeration treatment.

The attrition resistance is determined using a standard pump recycle method comprising cycling a water slurry of the filter aid at a fixed concentration through a centrifugal pump and measuring the change in flow rate of the filter aid versus the number of pump cycles. This parameter generally reflects the strength of the re-agglomerated final product to resist fracture of the agglomerate upon mechanical handling that would result in the formation of material similar in size and filtering characteristics to the starting material.

While Table II demonstrates the advantage of the low temperature mixing treatment prior to the final agglomeration, it was also used to compare two different methods and temperatures of heating the pre-treated material. Samples C and D were subjected to a final treatment of 1600° F. in a standard perlite expander while Samples E and F were subjected to a two-hour heat treatment in a muffle furnace at 1400° F.

The data of Table II illustrates the advantage of a low temperature heat treatment prior to the final heating and agglomeration of the perlite particles. The improvement of the low temperature treatment is best realized when the particulate mixture is mixed while subjecting it to a temperature in the range of from 365° to 600° F. for a time in the range of from 1 to 10 minutes. The particulate mixtures displayed in Table II had 5.0 weight percent $H_3BO_3$. They were mixed in a Patterson-Kelly mixer; however, the exact apparatus used to mix the particulate mixture during the low temperature treatment is not known to be critical and other means of mixing the particulate mixture may be employed.

The amount of $H_3BO_3$ normally used with the present invention is in the range of from 1.0 to 10 weight percent. A preferred embodiment of the invention would have the boron compound of $H_3BO_3$ in the range of from 3.0 to 5.0 weight percent. Table III illustrates the effect of the percentage of $H_3BO_3$ present in the mixture.

Table III

Effect of Percentage of $H_3BO_3$

| Material | % $H_3BO_3$ | Pre-agglomeration condition | PFR | PCD | $H_2O$ Sol (%) | 1 hour attrition PFR | PCD |
|---|---|---|---|---|---|---|---|
| A | (starting material) | | 26 | 20.5 | 0.12 | 23 | 21.5 |
| Sample G | 0 | none | 48 | 15.6 | 0.1 | — | — |
| Sample H | 2.0 | Patterson-Kelly 400° F., 5 Mins. | 85 | 14.2 | 0.16 | — | — |
| Sample I | 3.5 | 400° F., 5 Mins. | 100 | 14.2 | 0.38 | 53 | 20.8 |
| Sample J | 5.0 | 400° F., 5 Mins. | 118 | 13.2 | 0.50 | — | — |

Table III illustrates the effect of increasing percentages of $H_3BO_3$ in the particulate mixture. Upon increasing the percentage of $H_3BO_3$ from zero to 5.0 percent, using the same initial pre-agglomeration treatment and the same final heat treatment (in a conventional perlite expander) at 1600° F. for Samples G through J, the filtering properties of the product were markedly improved. Specifically, the flow rate through the product was increased and the cake density is lowered.

While the initial low temperature heat treatment distributes the boron compound over the surface of the particulate perlite, the agglomeration does not take place until the mixture is heated to higher temperatures. In embodiments of the invention utilizing $H_3BO_3$, the boric acid is converted to $B_2O_3$ by a dehydration at approximately 600° F. The conversion of the boron compound to $B_2O_3$ results in the agglomeration of the particles; however, mere agglomeration of the particles is not sufficient to produce a desirable product having utility as a filter aid. Insufficient heat treatment of the $B_2O_3$ coated perlite particles would result in a product having a relatively high water solubility and a low resistance to attrition to mechanical handling.

The high temperature heat treatment diffuses the $B_2O_3$ into the bulk structure of the perlite and the resulting product is therefore not simply a cemented agglomeration of particles with $B_2O_3$ as the cement. Particular success has been found where the particulate mixture is heated to insolubilize the $B_2O_3$ to a temperature in the range of from 1400° to 1800° F.

Table IV illustrates the improvement in properties of the present invention by a comparison with commercially available filter aids.

Table IV

Comparison of Properties of Agglomerated Filter Aids vs. Commerical Filter Aids

| Sample | Furnacing Conditions | PFR | PCD | $H_2O$ Sol (%) | 1 hour attrition PFR | PCD |
|---|---|---|---|---|---|---|
| Sample K | Expander 1600° F. pre-agglom. 5.0% $H_3BO_3$ | 157 | 10.2 | 0.30 | 78 | 19.2 |
| Sample L | Expander 1600° F. pre-agglom. 3.5% $H_3BO_3$ | 100 | 14.2 | 0.38 | 53 | 20.8 |
| Sample M | Muffle 2 hrs. 1400° F. pre-agglom. | 182 | 7.8 | 0.10 | 98 | 12.2 |
| Sample N | Muffle 25 min. 1400° F. pre-agglom. 5.0% $H_3BO_3$ | 111 | 10.6 | 0.10 | 79 | 14.5 |
| Sample O | Muffle 2 hours 1400° F. pre-agglom. 5.0% $H_3BO_3$ | 204 | 8.8 | 0.12 | 130 | 13.1 |
| Commerical Product #1 | | 124 | 14.5 | 0.02 | 87 | 18.1 |
| Commerical Product #2 | | 116 | 14.7 | .04 | 101 | 18.3 |

*all coated filter aids from starting material A (Table I) except Samples B and K.

A commercial embodiment of the present invention used to upgrade particulate perlite having an initial particle size of approximately 4 microns would include the commingling of the perlite with solid particulate H$_3$BO$_3$. Preferably, the H$_3$BO$_3$ would have a particle size such that it would pass through a −325 U.S. Standard mesh. The particulate H$_3$BO$_3$ and perlite would be combined to form a particulate mixture, approximately 5.0 weight percent of the mixture being H$_3$BO$_3$.

The particles are first treated at a temperature above 365° F. for at least 1 minute while mixing the particulate mixture to coat the particulate perlite at least partially with molten H$_3$BO$_3$. The H$_3$BO$_3$ is then converted to B$_2$O$_3$ by heating the particulate mixture to a temperature of at least 1200° F. for at least one hour. The second heat treatment also will promote diffusion of the B$_2$O$_3$ into the particulate perlite to lower the water solubility and resistance to attrition of the final agglomerate. A preferred temperature for the second heat treatment would be in the range of from 1400° to 1800° F. The product formed by the above process is an agglomerate of perlite and B$_2$O$_3$ having an apparent particle size of from 16 to 20 microns.

What is meant by apparent particle size is the average size of the agglomerated perlite particles recognizing that the final product is an agglomeration of smaller particles that will produce different particle size measurements depending upon the technique used to measure particle size.

While the product of the above process has particular utility for developing an improved filter aid from previously unacceptable perlite fines, the invention is not solely limited to that application of the product. The invention has been disclosed by example using a particular species of boron compound known to be operable with the present invention. One skilled in the art may find other boron compounds having equivalent performance, and the use of such compounds would be considered to be within the scope of the invention as it is disclosed herein and defined in the appended claims.

What is claimed is:

1. A method of forming a particulate product consisting essentially of agglomerated particulate perlite fines, said method comprising the steps of:
    (a) commingling said perlite fines with a boron compound to form a particulate mixture with said boron compound, said boron compound capable of being substantially converted to B$_2$O$_3$ at elevated temperatures;
    (b) initially heating said particulate mixture sufficiently to coat said perlite fines at least partially with said boron compound while continuously mixing said particulate mixture;
    (c) converting said boron compound to B$_2$O$_3$; and
    (d) diffusing said B$_2$O$_3$ into said perlite by additional heating of said particulate mixture; said steps resulting in the formation of a plurality of particles, said particles being larger than said perlite fines.

2. The method of claim 1 wherein said B$_2$O$_3$ is diffused into said perlite by heating said particulate mixture to a temperature in the range of from 1400° to 1800° F.

3. The method of claim 1 wherein said boron compound is a solid particulate material at room temperature.

4. The method of claim 3 wherein said solid particulate compound is H$_3$BO$_3$.

5. The method of claim 4 wherein said initial heating of said particulate mixture is conducted at a temperature in the range of from 365° to 600° F. for a time in the range of from 1 to 10 minutes.

6. The method of claim 3 wherein said boron compound comprises from 1 to 10 weight percent of said particulate mixture.

7. The method of claim 3 wheein said boron compound is a solid powder comprising from 3 to 5 weight percent of said particulate mixture.

8. The method of claim 7 wherein said boron compound is H$_3$BO$_3$ and has a size less than −325 U.S. Standard mesh.

9. A method of forming a particulate filter aid by agglomerating particulate perlite fines having an initial mean particle size of less than 30 microns comprising the steps of:
    (a) commingling said perlite fines with particulate solid H$_3$BO$_3$ to form a particulate mixture of approximately 5 weight percent H$_3$BO$_3$, said H$_3$BO$_3$ having a particle size of less than −325 U.S. Standard mesh;
    (b) initially heating said particulate mixture above 365° F. for at least one minute while mixing said particulate mixture; and
    (c) heating said particulate mixture to a temperature of at least 1200° F. for at least one hour, said steps resulting in the formation of a plurality of particles, said particles being larger than said perlite fines.

10. The method of claim 9 wherein step C is carried out at a temperature in the range of from 1400° to 1800° F.

11. The method of claim 9 in which said particulate perlite has an initial mean particle size of about 4 microns.

12. A particulate agglomerate of perlite and B$_2$O$_3$ having an apparent particle size of from 16 to 20 microns produced by the agglomeration of smaller perlite particles according to the method of claim 1.

13. A particulate agglomerate consisting essentially of perlite particles, said agglomerate being formed from fine particulate perlite and produced by initially coating said fine particulate perlite with molten H$_3$BO$_3$ while mixing said perlite and said H$_3$BO$_3$ to form a particulate mixture, subsequently converting said H$_3$BO$_3$ to B$_2$O$_3$ by heat treatment; and finally, diffusing said B$_2$O$_3$ into said perlite by heating said particulate mixture to a temperature of at least 1200° F.

14. A filter aid consisting essentially of a plurality of perlite agglomerates, said agglomerates having a mean size in excess of 20 microns, said agglomerates being comprised of a plurality of perlite particles having a mean particle size of approximately 5 microns bonded together with B$_2$O$_3$, to form said agglomerates, said B$_2$O$_3$ being insolubilized by diffusion into said perlite.

* * * * *

UNITED STATES PATENT AND TRADEMARK OFFICE
CERTIFICATE OF CORRECTION

PATENT NO. : 4,175,158
DATED : November 20, 1979
INVENTOR(S) : Elerington Saunders It is certified that error appears in the above—identified patent and that said Letters Patent is hereby corrected as shown below:

On the face sheet, after "Filed: Oct. 17, 1977" insert:
--Application made under 37 C.F.R. 1.47(b).--

Signed and Sealed this

Third Day of November 1981

[SEAL]

Attest:

GERALD J. MOSSINGHOFF

Attesting Officer       Commissioner of Patents and Trademarks